US008831643B2

(12) United States Patent
Finlow-Bates

(10) Patent No.: US 8,831,643 B2
(45) Date of Patent: Sep. 9, 2014

(54) SYSTEMS AND METHODS FOR UTILIZING HIDDEN ACCESS POINTS

(71) Applicant: QUALCOMM Incorporated, San Diego, CA (US)

(72) Inventor: Keir Finlow-Bates, Kangasala (FI)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/669,129

(22) Filed: Nov. 5, 2012

(65) Prior Publication Data

US 2014/0128102 A1    May 8, 2014

(51) Int. Cl.
*H04W 4/02* (2009.01)

(52) U.S. Cl.
USPC ........................................ 455/456.3; 370/338

(58) Field of Classification Search
CPC ....... H04W 64/00; H04W 4/02; H04W 28/08; H04W 84/18
USPC .................. 455/456.2, 456.3, 41.2, 434, 509; 370/338, 252, 328
See application file for complete search history.

(56) References Cited

U.S. PATENT DOCUMENTS

| 7,567,819 | B2 | 7/2009 | Alone et al. | |
|---|---|---|---|---|
| 8,116,287 | B2 * | 2/2012 | Krantz et al. | ............... 370/338 |
| 8,159,984 | B1 | 4/2012 | Loc et al. | |
| 2006/0227972 | A1 | 10/2006 | Brok et al. | |
| 2008/0081597 | A1 | 4/2008 | Cole | |
| 2008/0198811 | A1 | 8/2008 | Deshpande et al. | |
| 2010/0309815 | A1 | 12/2010 | Yepez et al. | |

OTHER PUBLICATIONS

Doppler K., et al., "On Efficient Discovery of Next Generation Local Area Networks", Wireless Communications and Networking Conference (WCNC), 2011 IEEE, IEEE, Mar. 28, 2011, pp. 269-274, XP031876259.
International Search Report and Written Opinion—PCT/US2013/068028—ISA/EPO—Jan. 22, 2014.

* cited by examiner

*Primary Examiner* — Phuoc H Doan
(74) *Attorney, Agent, or Firm* — Bay Area Technology Law Group PC

(57) ABSTRACT

Systems and methods are disclosed to use location information for a client device to selectively access hidden access point information such as service set identifiers (SSIDs) stored on a remote server on the basis of the location information. Using the hidden access point information, the client device may form an association with a hidden access point. The client device may use an integrated location determining system to obtain the location information.

21 Claims, 5 Drawing Sheets

SYSTEMS AND METHODS FOR UTILIZING HIDDEN ACCESS POINTS

FIELD OF THE PRESENT INVENTION

This disclosure generally relates to wireless communication systems and more specifically to systems and methods for providing access to hidden access points.

BACKGROUND OF THE INVENTION

Wireless networks are increasingly employed to provide various communication functions including voice, video, packet data, messaging and the like. A wireless network such as a wireless local area network (WLAN) in a conventional infrastructure configuration comprises a number of nodes, which may include any number of access points (APs) and any number of stations (STAs). Each AP may act as a coordinator for communication with the STAs.

Networks operating under IEEE 802.11 protocols may be configured so that the AP does not broadcast the service set identifier (SSID). Such an AP may be termed a hidden access point and this configuration may provide a measure of security against unauthorized access to the network or other hacking activities by preventing public disclosure of the existence of the network. However, not advertising an SSID may also complicate access by authorized users. Even though security issues may make offering unrestricted access to a network unwise, many situations exist in which it would be desirable to grant customers and others with legitimate uses access to the network. Particularly for temporary or intermittent uses, the use of a hidden access point may hinder usage that the network owner would otherwise want to provide. This disclosure details systems and methods to facilitate usage of networks employing hidden access points.

SUMMARY OF THE INVENTION

In accordance with the above needs and those that will be mentioned and will become apparent below, this specification discloses methods for wireless communication including the steps of obtaining location information for a client device, sending the location information for the client device to a server having a database of hidden access point information, and sending selected hidden access point information from the server to the client device on the basis of the location information for the client device. Further, suitable methods may also include the step of forming an association between the client device and a hidden access point using hidden access point information from the server.

In one aspect, the hidden access point information comprises a service set identifier (SSID) for the hidden access point. Additionally, the hidden access point information further comprises a cryptographic key for the hidden access point.

In another aspect, obtaining location information for the client device comprises making a position determination using an integrated location determination system.

One embodiment may also include the step of maintaining the database on the server by receiving hidden access point information for a plurality of hidden access points. Further, the server may receive hidden access point information for a first hidden access point directly from the first hidden access point. In addition, the first hidden access point may automatically determine location information for the first hidden access point.

Yet another embodiment may include the steps of storing the selected hidden access information with the client device, wherein the selected hidden access point information corresponds to a plurality of hidden access points, determining a current location of the client device and retrieving hidden access information corresponding to a first hidden access point from the selected hidden access information on the basis of the current location of the client device.

In another aspect, the location information for the client device may include information regarding a future location.

This disclosure is also directed to systems including a client device having a wireless local area network (WLAN) module configured to provide wireless communications with an access point and a location determination module, wherein the client device is configured to communicate location information obtained from the location determination system to a server and receive hidden access point information from the server. Additionally, the WLAN module may be configured to associate with a hidden access point using received hidden access point information.

In one aspect, the hidden access point information may be a service set identification (SSID) for the hidden access point. Further, the hidden access point information may also include a cryptographic key for the hidden access point.

In another aspect, the location determination module may be configured to automatically determine location information for the client device. In some embodiments, the location determination module may be a global positioning satellite (GPS) system.

In yet another aspect, the client device may also include a memory for storing the hidden access point information, wherein the hidden access point information corresponds to a plurality of hidden access points, and the client device may be further configured to retrieve hidden access information corresponding to a first hidden access point from the stored hidden access information on the basis of a current location of the client device.

This disclosure is also directed to systems including a server that has a database of hidden access point information and a communications link for transferring selected hidden access point information to a client device on the basis of location information received from the client device. In such embodiments, the hidden access point information may be service set identifiers (SSIDs) for a plurality of hidden access points. Further, the hidden access point information may also include location information for the plurality of hidden access points.

In one aspect, the server may be configured to receive hidden access point information for a first hidden access point, such that the server may also be configured to update the database with the hidden access point information for the first hidden access point.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

Figure 1:
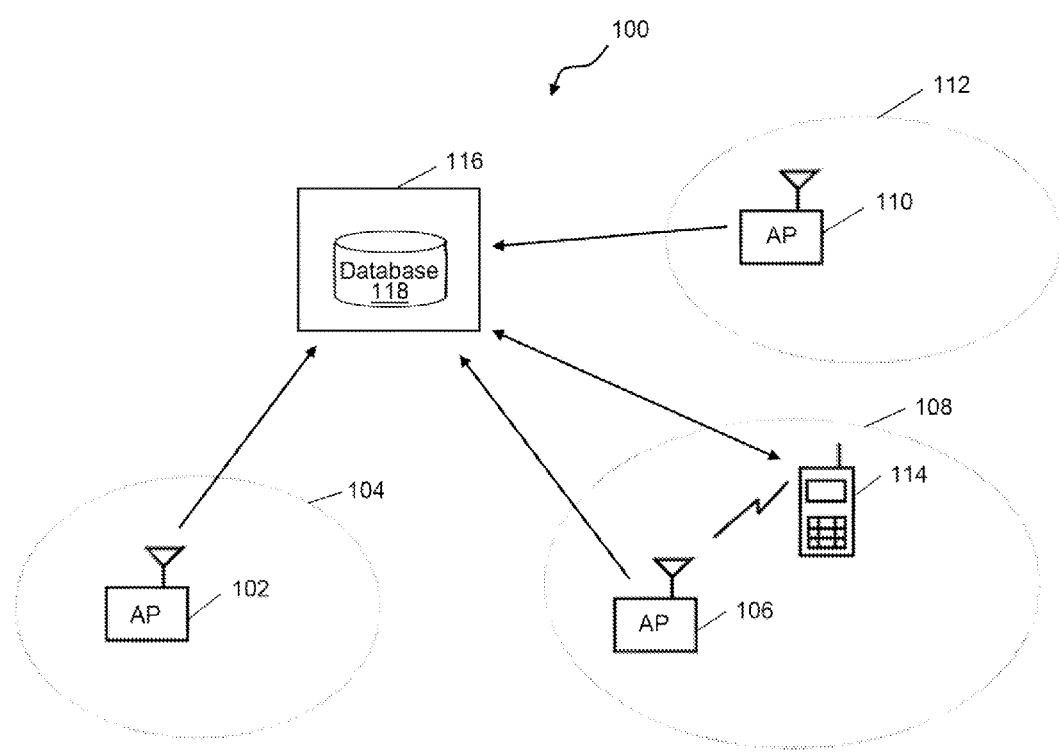
FIG. 1 depicts a wireless communication system for providing access to hidden access points, according to one embodiment of the invention.

At the outset, it is to be understood that this disclosure is not limited to particularly exemplified materials, architectures, routines, methods or structures as such may, of course, vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), and flash memory or any other medium that can be used to store the desired information.

Further, embodiments are discussed in specific reference to wireless networks. As such, this disclosure is applicable to any suitable wireless communication systems having the necessary characteristics. Accordingly, as used herein, the term "station" may mean any node in a wireless communications network having a role equivalent to a conventional station in an 802.11 infrastructure network and likewise, the term "access point" may mean any node having a role equivalent to a conventional access point.

In the figures, a single block may be described as performing a function or functions; however, in actual practice, the function or functions performed by that block may be performed in a single component or across multiple components, and/or may be performed using hardware, using software, or using a combination of hardware and software. Also, the exemplary wireless network devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a tangible computer-readable storage medium comprising instructions that, when executed, performs one or more of the methods described above. The tangible computer-readable data storage medium may form part of a computer program product, which may include packaging materials.

The tangible computer-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the invention in any manner and may change depending upon context. Further, sequential terms such as first and second may be used to distinguish similar elements, but may be used in other orders or may change also depending upon context.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

Aspects of this disclosure will be described in the context of an exemplary wireless communication system 100, as shown schematically in FIG. 1. As depicted, each of a plurality of access points (APs) is configured to provide access to a wireless local area network (WLAN), such as one conforming to 802.11 protocols promulgated by the Institute of Electrical and Electronics Engineers. Accordingly, AP 102 may be configured to provide a first infrastructure WLAN having an effective range 104, designated schematically. Likewise AP 106 may manage a second infrastructure WLAN having an effective range 108 and AP 110 may manage a third infrastructure WLAN having an effective range 112. Client device 114, such as a mobile phone or the like, may be within range 108 of AP 106 and thus may form a link with AP 106 as a station (STA) to join the WLAN.

A STA typically performs an established procedure to establish a link with an AP when first powering up or moving into a new WLAN coverage area. Forming a link allows the STA to be mapped to the AP, in turn enabling the STA to receive distribution service. The link allows the distribution service to know which AP to contact for the STA. Thus, the infrastructure WLAN formed by an AP and any associated STAs may be known as a basic service set (BSS). Although not shown to help maintain clarity, a plurality of BSSs, each managed by a separate AP, may form an extended service set (ESS) such that they are treated as a single device at the logical link layer. An ESS may be viewed as corresponding to a WLAN having an effective range equivalent to the sum of each constituent AP. In either case, each separate BSS and ESS may be identified by a unique service set identifier (SSID).

To establish a link between a STA and an AP, a first handshake involving the exchanged of an authentication request frame and an authentication response frame between the STA and AP validates the respective identities. The authentication process may also be used to establish the use of a suitable encryption scheme, such as Wi-Fi Protected Access II (WPA2), Wi-Fi Protected Access (WPA), Wired-equivalent Privacy (WEP), or the like. Following authentication, a second handshake is performed that involves exchange of an association request frame and an association response frame, and may result in the allocation of network resources by the AP and the formation of an active link. To participate in the authentication and association process, the STA generally needs the SSID of the WLAN.

As per the relevant 802.11 protocols, an AP periodically broadcasts a management frame known as a beacon frame containing information for accessing and maintaining a link with the AP, such as time stamps, supported rates and connection parameters. The beacon frame may or may not provide the SSID for the WLAN. For a WLAN managed by an AP that is configured to broadcast the SSID in the beacon frame, a given STA may receive the beacon frame transmission and determine the SSID for the WLAN. Alternatively, a STA may send a probe request frame without designating a specific SSID. In response, the AP may be configured to reply with a probe response frame that includes the SSID. Under these circumstances, the STA may readily determine the SSID of the WLAN either from the beacon frame or through the probe request and response exchange.

However, it may be desirable to configure a given WLAN so that the AP or APs operate in hidden mode and do not broadcast the SSID to help restrict access to the WLAN. For example, such a configuration may provide increased security relative to a WLAN using a non-hidden access point. Since a hidden AP does not broadcast beacons or the SSID, conventional methods of listening for beacon frames to determine the SSID of WLANs that are within range may not be employed. Further, particularly when no authorized station is connected, an unauthorized person may be unable to detect any radio signals associated with the WLAN and may therefore be unable to determine the presence of the AP. Similarly, the use of hidden APs may help restrict hacking techniques such as war driving that are based on monitoring wireless traffic. Restricting access by hiding the SSID may also be used to guard against over subscription and the corresponding performance degradation that may result if access to the WLAN were granted indiscriminately. When operating in hidden mode, the AP may also be configured so that it does not respond to undirected probe responses. For the purposes of this disclosure, a hidden AP may be characterized as one that does not reveal the SSID of its WLAN, so that a STA seeking to associate may need to determine the SSID from a source other than the hidden AP. Although embodiments of this disclosure are described in the context of hidden APs, the techniques may be applied to any network node configured so that it does not broadcast or otherwise provide an SSID to a STA seeking to establish a link.

Returning then to FIG. 1, to associate with the WLAN of AP 106, client device 114 may need the corresponding SSID. In this context, APs 102, 106 and 110 may all be configured to operate in hidden mode. Accordingly, client device 114 may be unable to obtain the SSID from AP 106, even though within range 108. Accordingly, remote server 116 may be configured to maintain a database 118 of hidden APs containing records for WLANs having APs operating in hidden mode, including an SSID for each WLAN. Client device 114 may then communicate with server 116 to obtain the SSID for AP 106, allowing client device 114 to authenticate and associate with AP 106. As will be described below, database 118 may include location information for each AP operating in hidden mode. Further, as described below, information corresponding to the current location of client device 114 may be used to selectively access information from database 118 to obtain the SSIDs of APs that are likely to be within range. For example, server 116 may be configured to select records corresponding to hidden APs that are within a predetermined threshold distance of the position corresponding to the location information.

Server 116 may be configured to maintain information in database 118 corresponding to a plurality of hidden access points, such as APs 102, 106 and 110. As such, one record may be assigned to each AP and include the corresponding SSID and location information. The location information generally includes present or future known positions of the AP. In one aspect, an AP may have an integrated position determination system such as a global positioning satellite (GPS) system, a WLAN-based positioning system, a cellular-based positioning system or any other suitable location determining mechanism that allows the location reporting to be performed automatically. Such implementations are particularly suitable for temporary or mobile access points. Alternatively, the location information for a given AP may be determined manually and added to database 118.

Server 116 may be implemented as desired, such as in a conventional manner through a suitable processing unit and a memory for storing appropriate processor-readable instructions for performing the method steps and processes of this disclosure. In one aspect, server 116 may be implemented as an Internet information server. Server 116 may employ any suitable operating system and may include programming in one or more known programming languages. Server 116 may support various communications protocols as appropriate to the transfer of information with client device 114 and hidden APs, 102, 106 and 110 if so configured, including without limitation file transfer protocol (FTP), hyptertext transfer protocol (HTTP), secure socket layer (SSL), and other equivalents. Similarly, database 118 may be implemented in any suitable manner, such as through a database management system configured to operate and maintain a relational database.

In one aspect, one or more of APs 102, 106 and 110 may be configured to automatically communicate with server 116 over a suitable wide area network (WAN), such as the Internet. In some embodiments, one or more connections to the WAN may be a wireless WAN (WWAN) employing a suitable communication protocol such as a cellular-based network including code division multiple access (CDMA), high speed packet access (HSPA(+)), high-speed downlink packet access (HSDPA), global system for mobile communications (GSM), enhanced data GSM environment (EDGE), long term evolution (LTE), WiMax, and others. Alternatively, information for a given AP may be added to database 118 manually.

As desired, database 118 may also contain other information to facilitate the process of client device 114 joining a network. Suitable information may include supported rates, capabilities, parameters, and other network characteristics.

In one embodiment, database 118 may be configured to maintain encryption settings for one or more APs. Thus, in addition to obtaining the SSID for a given AP, client device 114 may also obtain the relevant cryptographic keys for the encryption system being used by the AP, allowing client device 114 to create a secure connection without additional manual configuration.

Client device 114 may also be configured to communicate with server 116 in any suitable manner. In one embodiment, client device 114 communicates with server 116 over a WAN, such as the Internet. In some embodiments, client device 114 may employ one of the WWAN communication protocols identified above. Client device 114 may also obtain information from server 116 using any other suitable communication link, including a wired connection, a public WLAN, or the like.

Further, client device 114 may be configured to obtain hidden AP information from database 118 on an as-needed basis or prospectively. Depending upon the implementation, a complete copy or a subset of the information based on a planned travel itinerary or other suitable criteria may downloaded to client device 114 to allow access to hidden AP information regardless of the availability of other connectivity options. In one embodiment, if a future travel plan is known for client device 114, information from database 118 associated with APs likely to be on a predicted route may be retrieved and cached locally by client device 114.

Client device 114 may be granted access to database 118 as desired to authorized or legitimate users by employing any suitable security mechanism. For example, customers may subscribe to a service that grants them access to networks managed by hidden APs. Further, different levels of access may be granted that involve subsets of the hidden APs.

In another aspect, client device 114 may have a location determination module configured to determine location information using an integrated position determination system such as a GPS system, a WLAN-based positioning system, a cellular-based positioning system or any other suitable location determining mechanism that allows current position information to be determined automatically. Alternatively or as a supplement, the location determination module of client device 114 may be configured to allow a user to enter current or predicted future position information manually. Accordingly, the location information associated with client device 114 may be utilized to selectively access hidden AP information from database 118 to obtain the SSIDs and other desired characteristics of APs that are likely to be within range.

As will be appreciated, the precision of the respective location determinations may influence operation of the system. For example, when accurate position information is available for client device 114, such as from an integrated GPS system, server 116 may be configured to retrieve records from database 118 having a high probability of being in range and usable. Use of progressively less precise systems, such as a WLAN-based position determination or a cellular-based system, may be configured to return a greater number of records given the greater degree of uncertainty associated with the location information, and may involve a modest trial and error process to determine whether and which of the hidden APs is actually in range.

Further, database 118 may be configured to maintain range information for one or more of the hidden APs. As will be appreciated, the range of an AP may vary depending upon the type of wireless protocol being employed, the characteristics of the hardware being used and environmental conditions, among others. Accordingly, the range information may be determined based on reported characteristics of the AP. Additionally, the range information may be determined empirically based upon actual performance. The range information may be used to filter the records maintained by database 118 so that server 116 provides only those APs likely to be in range of client device 114.

Figure 2:
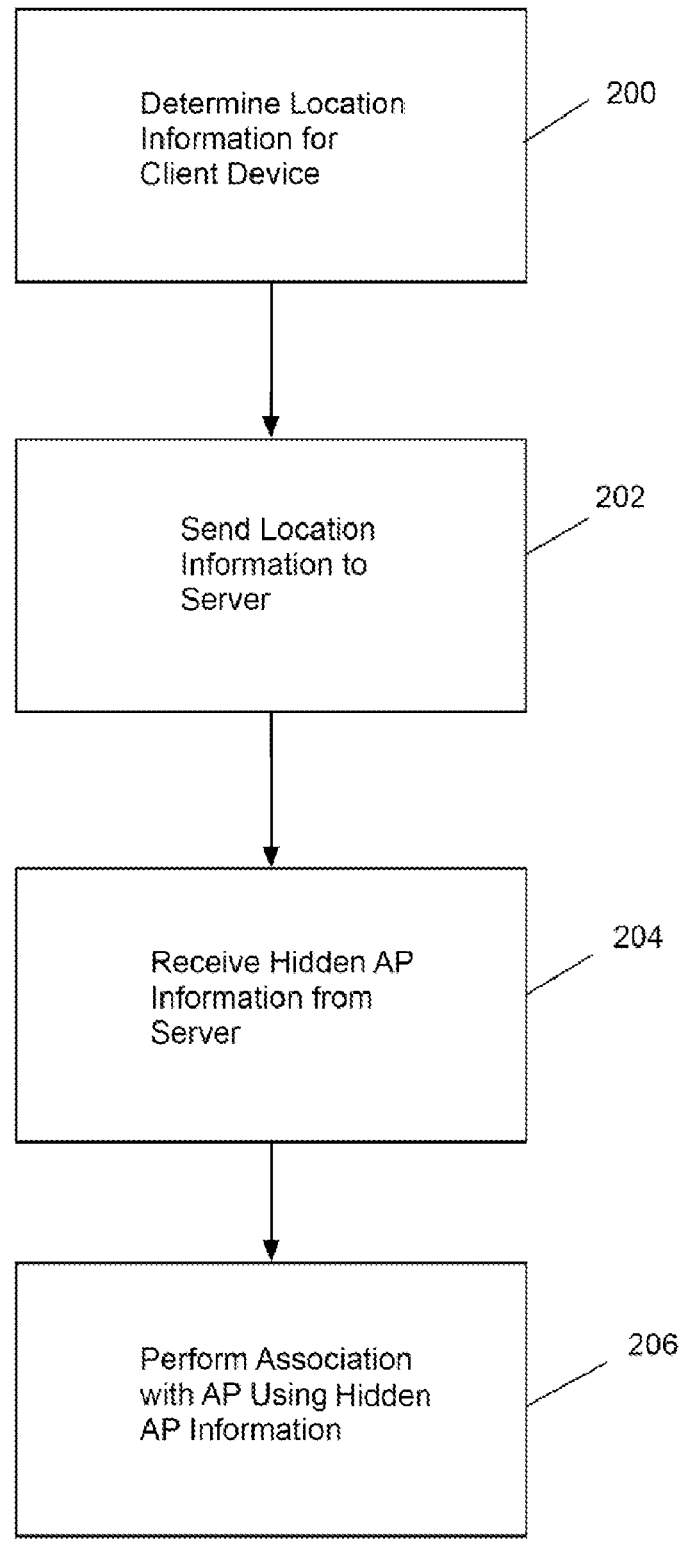
FIG. 2 depicts a flowchart showing a process for obtaining hidden access point information with a client device, according to one embodiment of the invention.

Thus, in one aspect, server 116 may provide hidden AP information to client device 114 on the basis of location information. An example of a suitable method for implementing the techniques of the disclosure is depicted in the flow chart of FIG. 2. As indicated by step 200, the routine may begin with client device 114 obtaining location information corresponding to a current or future position. The location information may be determined automatically using the location determination capabilities discussed above or may be manually input by the user. Client device 114 may then be configured to transmit the location information to server 116 in step 202, such as by one of the exemplary WWAN technologies. Next, client device 114 receives hidden AP information sent by server 116 in step 204, such as the SSID for an AP that is likely within range, such as AP 106. Client device 114 may then establish a connection with AP 106 using the SSID information for the appropriate authentication and association procedures in step 206.

As will be appreciated, using these techniques, client device 114 may be able to join a WLAN managed by AP 106. Since AP 106 is operating in hidden mode, client device 114 would not be able to obtain the appropriate SSID from AP 106 directly. Further, although client device 114 may obtain the hidden AP information using an auxiliary connection that may be relatively expensive or may offer reduced data transfer capabilities, such as one of the exemplary WWANs, upon obtaining the SSID, client device 114 may employ the WLAN associated with AP 106 which may be relatively inexpensive or may offer increased throughput or other performance advantages as compared to the WWAN.

Figure 3:
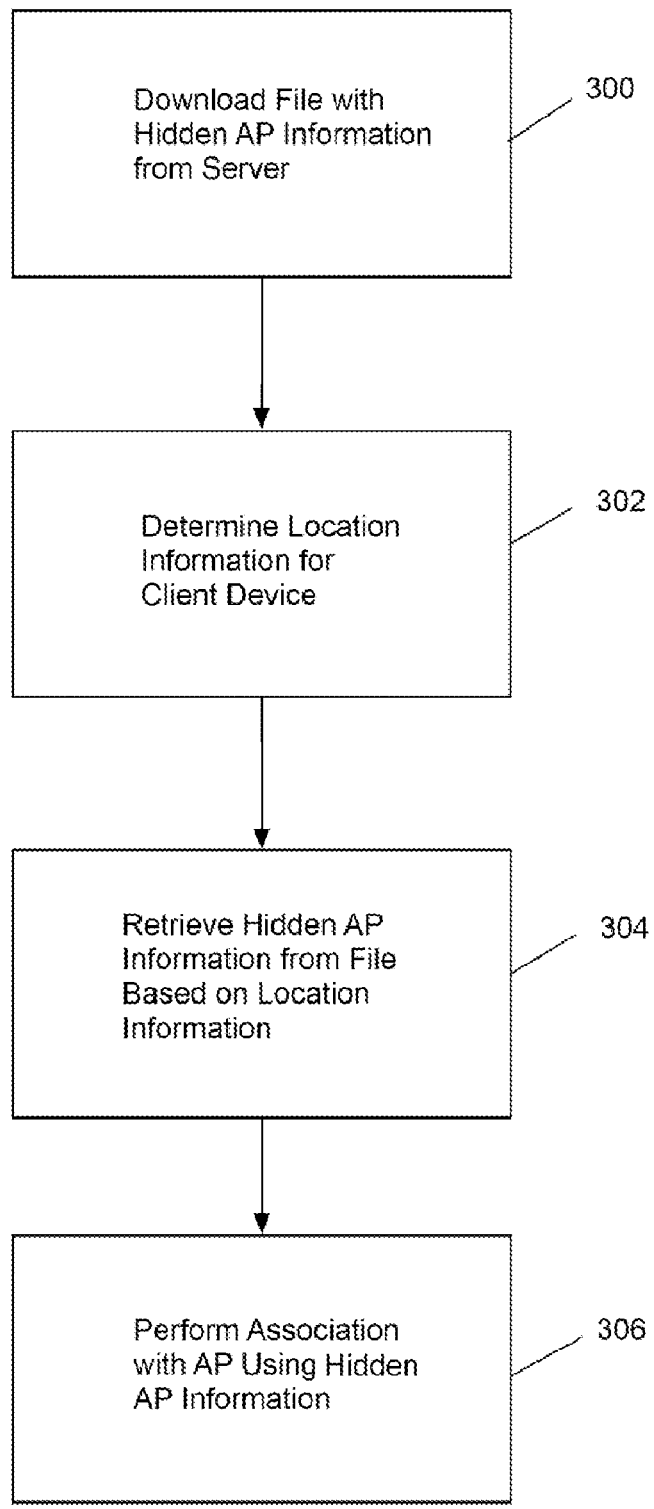
FIG. 3 depicts a flowchart showing another process for obtaining hidden access point information with a client device, according to one embodiment of the invention.

Another example of a suitable method for implementing the techniques of the disclosure is depicted in the flow chart of FIG. 3. The routine may begin as indicated by step 300 with client device 114 storing hidden AP information from server 116. As noted, the information may be a substantially complete copy of database 118 or may be a subset based on travel itinerary or other suitable criteria. Subsequently, client device 114 may be configured to determine or receive input of location information corresponding to a current position in step 302. Next, in step 304, client device 114 may retrieve hidden AP information from storage based upon the current position of client device 114. Client device 114 may then establish a connection with AP 106 using the SSID information in the appropriate authentication and association procedures in step 306.

Figure 4:
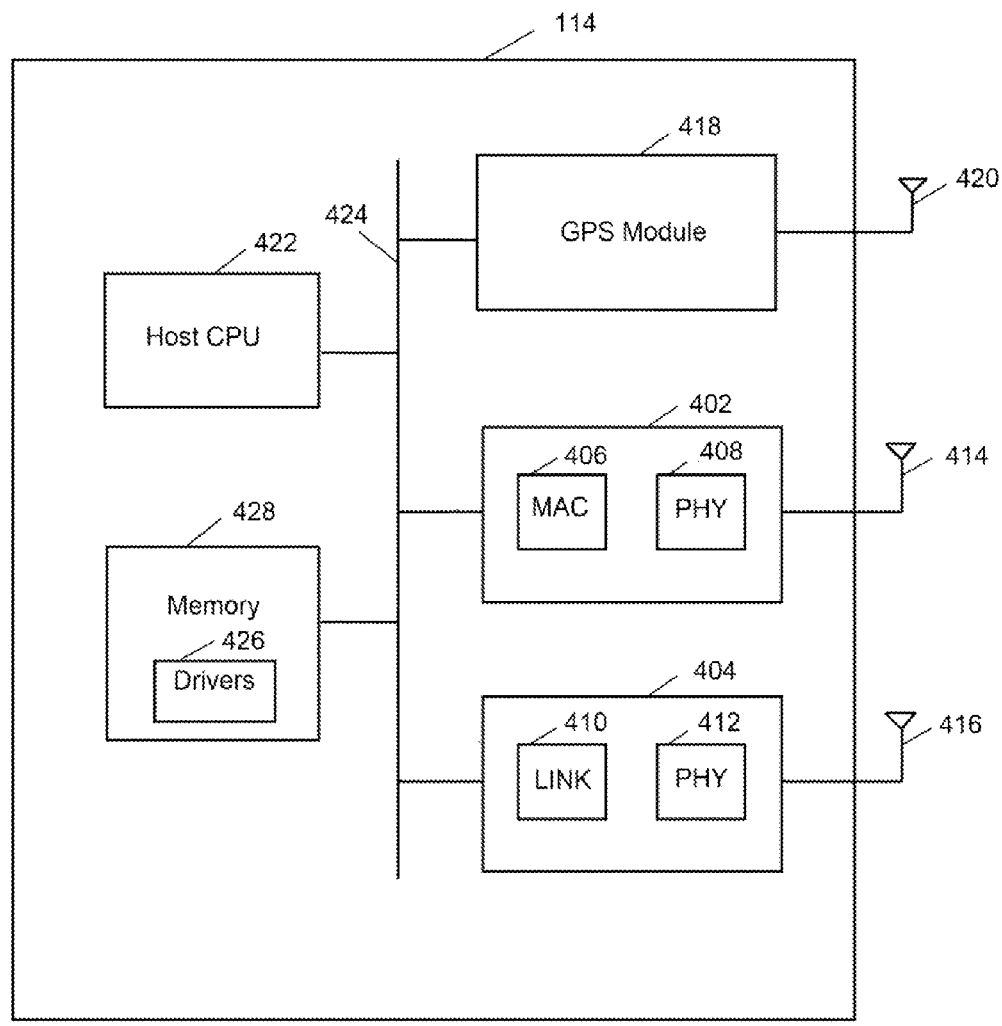
FIG. 4 schematically depicts functional blocks of a client device for receiving hidden AP information, according to one embodiment of the invention.

A high level schematic diagram of the principle functional blocks of one embodiment of client device 114 is shown in FIG. 4. Generally, client device 114 may employ an architecture in which the lower levels of the respective protocol stacks of the WLAN and WWAN communication systems are implemented in firmware and hardware modules, including WLAN module 402 and LTE module 404. In general, WLAN module 402 may include media access controller (MAC) 406 that performs functions related to the handling and processing of frames of data including verification, acknowledgment, routing, formatting and the like. Incoming and outgoing frames are exchanged between MAC 406 and physical layer (PHY) 408. Together, MAC 406 and PHY 408 modulate the frames according to the relevant 802.11 protocol and provide the analog processing and RF conversion necessary to transmit and receive wireless signals. Similarly, LTE module 404 implements a data link layer through media access controller/radio link controller (MAC/RLC) 410 and the physical layer (PHY) 412. As shown, WLAN module 402 and LTE module 404 each have an associated antenna, antennas 414 and 416, respectively. As desired, one or more antennas may be shared between the modules using switching techniques known in the art. In some embodiments, WLAN module 402 and LTE module 404 may be collocated on a common system, e.g., on the same circuit board or on distinct circuit boards within the same system, or may be embedded on the same integrated circuit as in a system on a chip (SoC) implementation.

Client device 114 is also depicted with an integrated location determining system in the form of GPS module 418 that may be configured to receive and process navigational satellite broadcasts received by antenna 420. However, as described above, other suitable location determination systems may be substituted for GPS module 418 or client device 114 may be configured to receive manually input location information.

Client device also may include host CPU 422 configured to perform the various computations and operations involved with the functioning of client device 114. Host CPU 422 is coupled to WLAN module 402, LTE module 404 and GPS module through bus 424, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. Upper layers of the protocol stacks of the WLAN and LTE systems as well as aspects of the GPS system are generally implemented in software as Drivers 426 stored in memory 428 that may be accessed by host CPU 422 over bus 424. As will be appreciated, memory 428 may also be used to store hidden AP information received from server 116.

Figure 5:
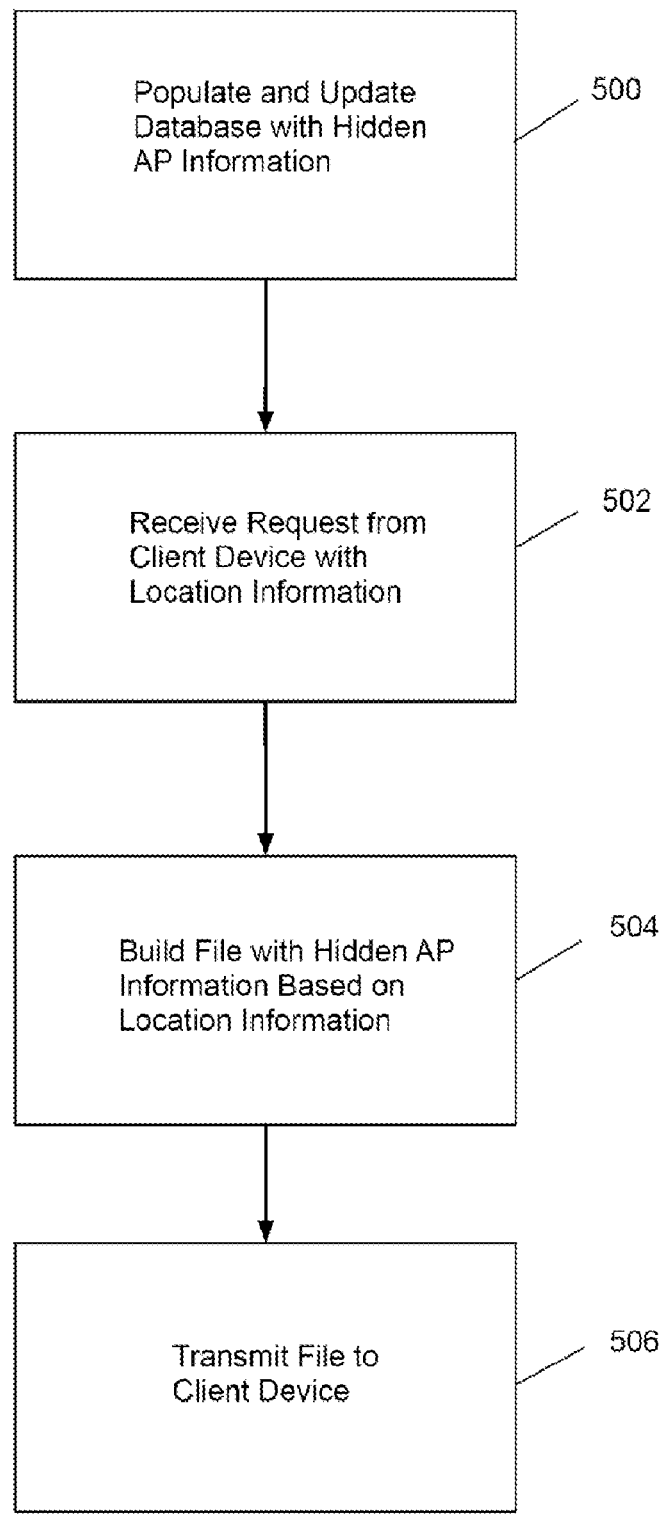
FIG. 5 depicts a flowchart showing a process for providing hidden access point information to a client device, according to one embodiment of the invention

In another aspect, an example of a suitable method for implementing the techniques of the disclosure with regard to server 116 is depicted in the flow chart of FIG. 5. The routine may begin as indicated by step 500 with server 116 populating and updating database 118 with hidden AP information. As described above, the hidden AP information may be provided to server 116 by the subject APs or may be provided manually. The populating and updating process as represented by step 500 may be an ongoing process so that information corresponding to new APs may be added, inactive APs may be removed and location information may be updated to reflect changes in the position of any of the APs. Server 116 may then receive a request for hidden AP information from client device 114 as represented by step 502. Depending upon the implementation, the request may be a request associated with current location information for client device 114 or reflect one or more expected future positions for client device 114. In step 504, server 116 may build a file having hidden AP information for transmission to client device 114. As described above, criteria for including information regarding a given AP may include location information for the AP, range information for the AP, accuracy of the location information associated with client device 114 and others. In light of the criteria used, server may include hidden AP information corresponding to AP 106 but not include hidden AP information corresponding to AP 102 or AP 110 in response to a request from client device 114. After building the file, server 116 may then transmit the associated hidden AP information to client device 114 in step 506 using any suitable connection.

As will be appreciated from the above discussion, an advantage of the systems and methods of this disclosure includes protecting the WLANs from unauthorized use by permitting the APs to be configured as hidden access points while still allowing legitimate users to connect. Further, these techniques offer considerable simplicity in configuration, particularly when integrated location determination functionality is available as the location determination and reporting may be automated. The techniques also allow access to the database to be conveniently monetized.

Described herein are presently preferred embodiments. However, one skilled in the art that pertains to the present invention will understand that the principles of this disclosure can be extended easily with appropriate modifications to other applications.

What is claimed is:

1. A method for wireless communication comprising:
   obtaining location information indicating a position for a client device;
   sending the location information for the client device to a server having a database of hidden access point information;
   selecting hidden access point information for at least one access point from the database of hidden access point information based, at least in part, on a distance between the at least one access point and the position of the client device; and
   sending the selected hidden access point information from the server to the client device.

2. The method of claim 1, further comprising forming an association between the client device and a hidden access point using hidden access point information sent by the server to the client device.

3. The method of claim 1, wherein the hidden access point information comprises a service set identifier (SSID) for the hidden access point.

4. The method of claim 3, wherein the hidden access point information comprises a cryptographic key for the hidden access point.

5. The method of claim 1, wherein obtaining location information for the client device comprises making a position determination using an integrated location determination system.

6. The method of claim 1, further comprising maintaining a database on the server by receiving hidden access point information from a plurality of hidden access points.

7. The method of claim 6, wherein the server receives hidden access point information for a first hidden access point directly from the first hidden access point.

8. The method of claim 7, wherein the first hidden access point automatically determines location information for the first hidden access point.

9. The method of claim 1, wherein the selected hidden access point information corresponds to a plurality of hidden access points, further comprising storing the selected hidden access point information with the client device, determining a current location of the client device and retrieving hidden access information corresponding to a first hidden access point from the selected hidden access point information based on the current location of the client device.

10. The method of claim 1, wherein the location information for the client device comprises a future position.

11. A client device, comprising a wireless local area network (WLAN) module configured to provide wireless communications with an access point and a location determination module, wherein the client device is configured to communicate location information indicating a position of the client device obtained from the location determination module to a server and receive hidden access point information from the server for at least one access point that is selected based, at least in part, on a distance between the at least one access point and the position of the client device.

12. The client device of claim 11, wherein the WLAN module is configured to associate with a hidden access point using received hidden access point information.

13. The client device of claim 12, wherein the hidden access point information comprises a service set identification (SSID) for the hidden access point.

14. The client device of claim 13, wherein the hidden access point information further comprises a cryptographic key for the hidden access point.

15. The client device of claim 11, wherein location determination module is configured to automatically determine location information for the client device.

16. The client device of claim 15, wherein the location determination module is a global positioning satellite (GPS) system.

17. The client device of claim 11, wherein the hidden access point information corresponds to a plurality of hidden access points, wherein the client device further comprises a memory for storing the hidden access point information, and wherein the client device is further configured to retrieve hidden access point information corresponding to a first hidden access point from the stored hidden access point information based on a current location of the client device.

18. A server comprising a database of hidden access point information and a communications link, wherein the server is configured to transfer over the communications link selected hidden access point information from the database of hidden access point information to a client device, wherein the server receives location information indicating a position of the client device and selects hidden access point information for at least one access point based, at least in part, on a distance between the at least one access point and the position of the client device.

19. The server of claim 18, wherein the hidden access point information comprises service set identifiers (SSIDs) for a plurality of hidden access points.

20. The server of claim 19, wherein the hidden access point information further comprises location information for the plurality of hidden access points.

21. The server of claim 18, wherein the server is configured to receive hidden access point information for a first hidden access point and wherein the server is configured to update the database of hidden access point information with the hidden access point information for the first hidden access point.

* * * * *